United States Patent
Chen

(10) Patent No.: US 7,916,077 B2
(45) Date of Patent: Mar. 29, 2011

(54) METHOD FOR OBTAINING CORRECT PHASE INVERSION POINTS IN SIGNAL OF GPS

(75) Inventor: Hung-Sheng Chen, Banqiao (TW)

(73) Assignee: Altek Corporation, Hsinchu (TW)

( * ) Notice: Subject to any disclaimer, the term of this patent is extended or adjusted under 35 U.S.C. 154(b) by 173 days.

(21) Appl. No.: 12/408,821

(22) Filed: Mar. 23, 2009

(65) Prior Publication Data
US 2010/0156717 A1    Jun. 24, 2010

(30) Foreign Application Priority Data
Dec. 24, 2008  (TW) ................. 97150510 A

(51) Int. Cl.
G01S 19/29    (2010.01)
G01S 11/02    (2010.01)
G01S 5/14     (2010.01)
G01S 19/28    (2010.01)
G01S 19/30    (2010.01)

(52) U.S. Cl. .......... 342/357.68; 342/357.12; 342/357.67; 342/357.69

(58) Field of Classification Search ............. 342/357.67, 342/357.68, 357.69, 357.12
See application file for complete search history.

(56) References Cited

U.S. PATENT DOCUMENTS

| | | | | |
|---|---|---|---|---|
| 3,777,272 A | * | 12/1973 | Fletcher et al. | 327/156 |
| 4,821,294 A | * | 4/1989 | Thomas, Jr. | 375/343 |
| 6,532,251 B1 | * | 3/2003 | King et al. | 375/142 |
| 7,006,790 B2 | * | 2/2006 | Bloebaum et al. | 455/13.2 |
| 7,778,311 B2 | * | 8/2010 | Jia et al. | 375/150 |
| 7,817,084 B2 | * | 10/2010 | Pon et al. | 342/357.69 |
| 2002/0183070 A1 | * | 12/2002 | Bloebaum et al. | 455/456 |
| 2003/0187575 A1 | * | 10/2003 | King et al. | 701/213 |
| 2006/0031696 A1 | * | 2/2006 | King et al. | 713/400 |
| 2007/0076788 A1 | * | 4/2007 | Jia et al. | 375/150 |
| 2010/0265134 A1 | * | 10/2010 | Yoshioka | 342/357.69 |

* cited by examiner

*Primary Examiner* — Thomas H Tarcza
*Assistant Examiner* — Frank McGue
(74) *Attorney, Agent, or Firm* — Stevens & Showalter LLP

(57) ABSTRACT

A method for obtaining correct phase inversion points in a signal of global positioning system (GPS) includes the following steps. A satellite signal from one of a plurality of satellites is received continuously. A plurality of phase inversion points in the received satellite signal is interpreted. Each time difference between each two adjacent phase inversion points among the plurality of phase inversion points is calculated. It is determined whether each of the time differences is an integral multiple of 20 milliseconds. A data is retrieved every 20 milliseconds from the satellite signal by using a first phase inversion point in the plurality of phase inversion points as a starting point when each of the time differences is an integral multiple of 20 milliseconds. By finding out a plurality of correct phase inversion points in the satellite signal, the positioning speed is increased, and thus a positioning time required is reduced.

5 Claims, 3 Drawing Sheets

METHOD FOR OBTAINING CORRECT PHASE INVERSION POINTS IN SIGNAL OF GPS

CROSS-REFERENCE TO RELATED APPLICATIONS

This non-provisional application claims priority under 35 U.S.C. §119(a) on Patent Application No(s). 097150510 filed in Taiwan, R.O.C. on Dec. 24, 2008 the entire contents of which are hereby incorporated by reference.

BACKGROUND OF THE INVENTION

1. Field of Invention

The present invention relates to a method for obtaining a signal of global positioning system (GPS), and more particularly, to a method for obtaining correct phase inversion points in a signal of GPS.

2. Related Art

A global positioning system (GPS) is a medium-range circular-orbit satellite navigation system. The GPS may provide accurate positioning, velocity measuring, and high-precision time standard for most of the areas (98%) on the surface of the earth. The GPS is developed and maintained by the U.S. Department of Defense for fulfilling the demands of continuously and accurately determining three-dimensional positions, three-dimensional movements, and time for a military user at any place on the globe or in the terrestrial space. The system includes 24 GPS satellites in the space, one master control station, 3 data upload stations, 5 monitor stations, and GPS receivers serving as user terminals on the earth. Only 4 satellites are needed at least to determine the position and altitude of the user terminal on the earth rapidly. The larger the number of satellites from which the user terminal may receive data, the more precise the decoded position is.

The GPS has features such as being free from weather conditions, a high global coverage rate (98%), and moveable positioning, and therefore, in addition to military applications, the GPS is also widely used for civilian navigation (such as plane navigation, ship navigation, and vehicle navigation) and positioning (such as vehicle guard and positioning of mobile communication devices), etc.

A satellite will broadcast 1 bit ephemeris data through a phase angle (180 degrees) of an inverted signal every 20 milliseconds. That is to say, in a satellite signal, a time interval between phase inversion points is a multiple of 20 milliseconds. But as the satellite orbits the earth, when the GPS is receiving the satellite signal sent by the satellite, the satellite signals received by the GPS may vary in intensity due to the positions of the satellite. For example, when the satellite is right above the GPS, the signal is intense, and when the satellite is close to the horizon, the signal will be relatively weak. Meanwhile, the satellite signal may also be interfered by other electromagnetic radiations, so that the GPS might suffer from bad reception. Thus, when the satellite signal is weak or the noises are intense, the satellite signal received by the GPS might have phase inversion points that are not multiples of 20 milliseconds due to the interferences. Accordingly, misjudgment actions occur when the GPS is resolving the satellite signal. A time for correct positioning is extended as it is required a repeated and time-consuming process of receiving the satellite signals all over again for positioning.

SUMMARY OF THE INVENTION

The present invention is directed to a method for obtaining correct phase inversion points in a signal of global positioning system (GPS). The method may avoid the influences resulted from a weak satellite signal or noises that might extend a time for correct positioning.

The present invention provides a method for obtaining correct phase inversion points in a Signal of GPS, which includes the following steps. A satellite signal from one of a plurality of satellites is received continuously. A plurality of phase inversion points in the received satellite signal is interpreted. Each time difference between each two adjacent phase inversion points among the plurality of phase inversion points is calculated. It is determined whether each time difference is an integral multiple of 20 milliseconds. When each time difference is an integral multiple of 20 milliseconds, a data is retrieved from the satellite signal every 20 milliseconds by using a first phase inversion point in the plurality of phase inversion points as a starting point.

Each phase inversion point is logical 0 to logical 1 or logical 1 to logical 0.

When the time differences are not all the integral multiple of 20 milliseconds, a satellite signal from another satellite of a plurality of satellites is received continuously.

The step of interpreting a plurality of phase inversion points in the received satellite signal is interpreting the received satellite signal to obtain a plurality of phase inversion points within a time range. The time range may be 1 second, 2 seconds, or other time ranges.

In the method for obtaining correct phase inversion points in the Signal of GPS according to the present invention, a satellite signal is continuously received to obtain a plurality of phase inversion points, and then it is calculated whether each time difference between each two adjacent phase inversion points among the plurality of phase inversion points is an integral multiple of 20 milliseconds. When each time difference between each two adjacent phase inversion points is an integral multiple of 20 milliseconds, the correct phase inversion points in the Signal of GPS are obtained. Subsequently, by using a first phase inversion point as a starting point, a correct navigation data in the satellite signal may be obtained by taking a data from the satellite signal every 20 milliseconds. The method for obtaining correct phase inversion points in the Signal of GPS provided in the present invention may still obtain the correct phase inversion points in the satellite signal, even being influenced by the weak satellite signal or intense noises, so that the positioning speed may be increased, and the positioning time required is reduced.

The features and implementations of the present invention are now illustrated by the most preferred embodiments in connection with the drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
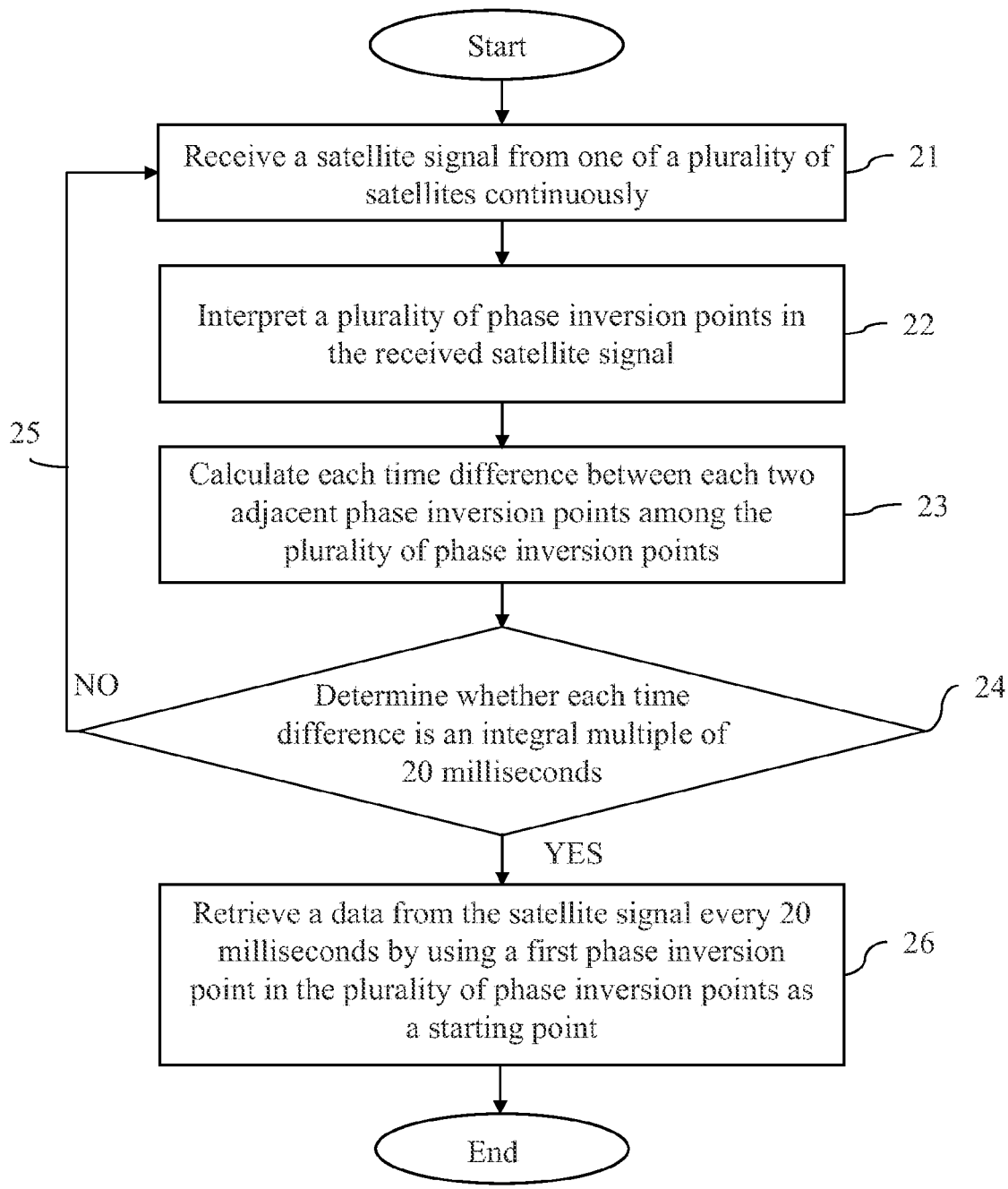
FIG. 1 is a flowchart of a method for obtaining correct phase inversion points in a signal of global positioning system (GPS) according to the present invention.

FIG. 1 is a flowchart of a method for obtaining correct phase inversion points in a signal of global positioning system (GPS) according to the present invention Referring to FIG. 1, the method for obtaining correct phase inversion points in the Signal of GPS according to the present invention includes the following steps. A satellite signal from one of a plurality of satellites is continuously received (step 21). A plurality of phase inversion points in the received satellite signal is interpreted (step 22). Each time difference between each two adjacent phase inversion points among the plurality of phase inversion points is calculated (step 23). It is determined whether each of the time differences is an integral multiple of 20 milliseconds (step 24). When each of the time differences is an integral multiple of 20 milliseconds, a data is retrieved from the satellite signal every 20 milliseconds by using a first phase inversion point in the plurality of phase inversion points as a starting point (step 26). When the time differences are not all the integral multiple of 20 milliseconds, step 21 is repeated, in which the satellite signal from another satellite of the plurality of satellites is continuously received (step 25).

The method for obtaining correct phase inversion points in the Signal of GPS includes the following steps. In the first step (step 21), a plurality of satellites is searched for by a frequency range. For example, when three satellites are found, the longitude and latitude of a position of the GPS may be acquired, and when four satellites are found, the longitude and latitude, as well as the altitude of the GPS may be acquired. After the GPS has found a plurality of satellites, a satellite signal sent from one satellite of the found satellites is received with a tracking frequency that is capable of receiving a satellite signal having a maximum intensity. The satellite signal is propagated in the air in the form of an electromagnetic wave. After the GPS receives the satellite signal, a navigation data contained in the satellite signal is resolved. The navigation data is presented by interpreting a phase change in the satellite signal to convert the satellite signal into a binary digital signal composed of 0 and 1.

Figure 2:
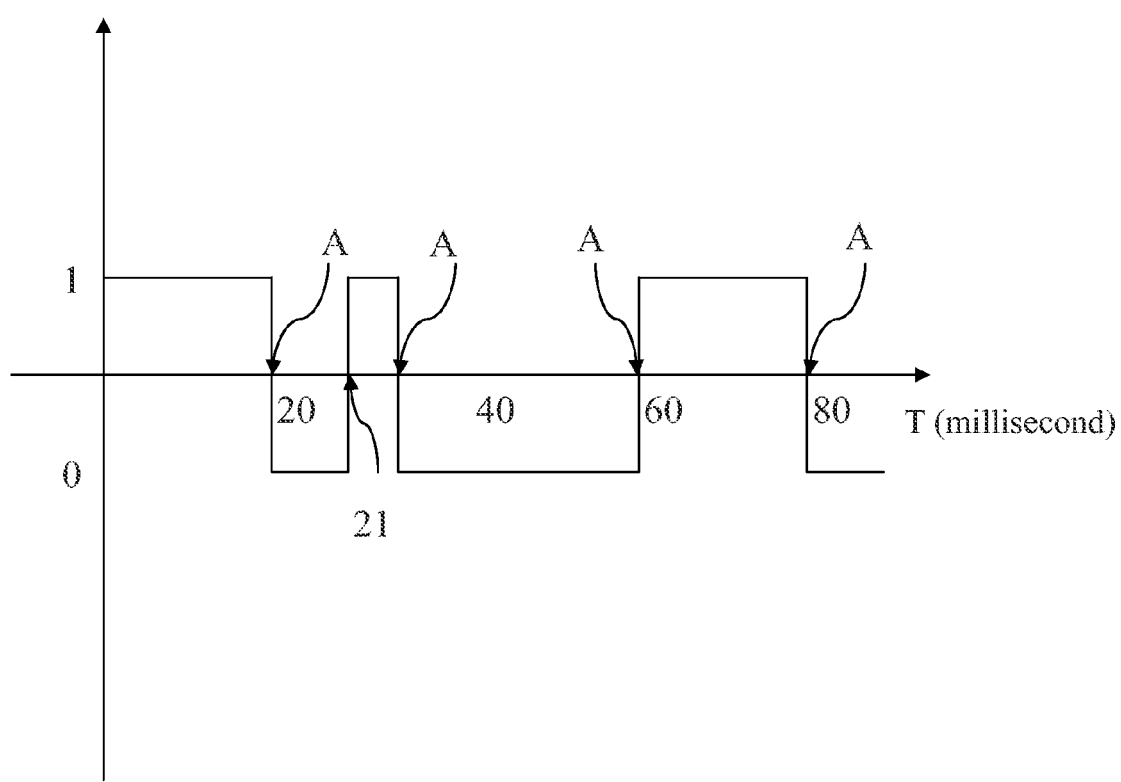
FIG. 2 is a schematic view of a satellite signal having a plurality of phase inversion points according to the present invention.

Subsequently, in the second step (step 22), a plurality of phase inversion points 21 in the received satellite signal is interpreted (as shown in FIG. 2). Referring to FIG. 2, the phase change in the satellite signal is converted into a binary digital signal composed of 0 and 1. As can be seen from the figure, a plurality of switching points representing switching between digital signal 1 and digital signal 0 exists in the satellite signal, that is, each phase inversion point A may be logical 0 to logical 1, or may also be logical 1 to logical 0. A plurality of phase inversion points A within a time range of the received satellite signal may be interpreted. This time range may be 1 second, 2 seconds, or other time ranges. Additionally, a certain number of phase inversion points A in the received satellite signal may also be interpreted. This certain number may be 5-20, or may also be more than 20.

Thus, in the third step (step 23), each time difference between the each two adjacent phase inversion points among the plurality of phase inversion points is calculated. The satellite broadcasts 1 bit ephemeris data every 20 milliseconds, that is, the satellite broadcasts 50 bit data for every second. In other words, in the satellite signal, a time interval of each phase inversion point should be a multiple of 20 milliseconds. Because the satellite orbits the earth, the satellite signals received by the GPS might vary in intensity corresponding to positions of the satellite when the GPS is receiving the satellite signals sent from the satellite. For example, when the satellite is right above the GPS, the signal is relatively intense, and when the satellite is close to the horizon, the signal is relatively weak. At the same time, the GPS also suffers from bad reception of the satellite signals due to the influences of interferences such as other electromagnetic radiations.

When the satellite signal is weak or the noises are intense, the satellite signals that are received by the GPS might have phase inversion points that are not a multiple of 20 milliseconds. As shown in FIG. 2, as the satellite signal is weak or the noises are intense, the satellite signals that are received by the GPS have a plurality of phase inversion changes during an interval time of 20 milliseconds. Accordingly, misjudgment actions occur when the GPS is resolving the satellite signal, and wrong navigation information is received. The time for correct positioning is extended as it is required a repeated and time-consuming process of receiving the satellite signal all over again for the positioning.

When the time differences between each two adjacent phase inversion points among the plurality of phase inversion points are calculated, at least 5, 10 or more than 20 phase inversion points are taken to calculate the time differences between each two adjacent phase inversion points. If the total number of the phase inversion points taken for calculating the time differences is too little, the misjudgment is still possible when the number of wrong phase inversion points exceeds the number range that is taken due to the weak satellite signal or intense noises. The positioning time might be extended if the total number of the phase inversion points taken for calculating the time differences is too much, and the system may be overloaded. Thus, the number for calculation may be decided based on the use area of the GPS. That is to say, the number or the time range of the phase inversion points to be searched may be decided based on the use area of the GPS.

In the fourth step (step 24), it is determined whether the time difference between each two adjacent phase inversion points among the plurality of phase inversion points is an integral multiple of 20 milliseconds. In the fifth step (step 25), when the time differences are not all the integral multiple of 20 milliseconds, indicating that the received satellite signal is weak or the noises are intense, the procedure returns to the first step (step 21), which is slightly changed that the satellite signal from another satellite of the plurality of satellites is continuously received, so as to avoid receiving the satellite signal from a satellite having a weak signal that results in an extended time for correct positioning.

Figure 3:
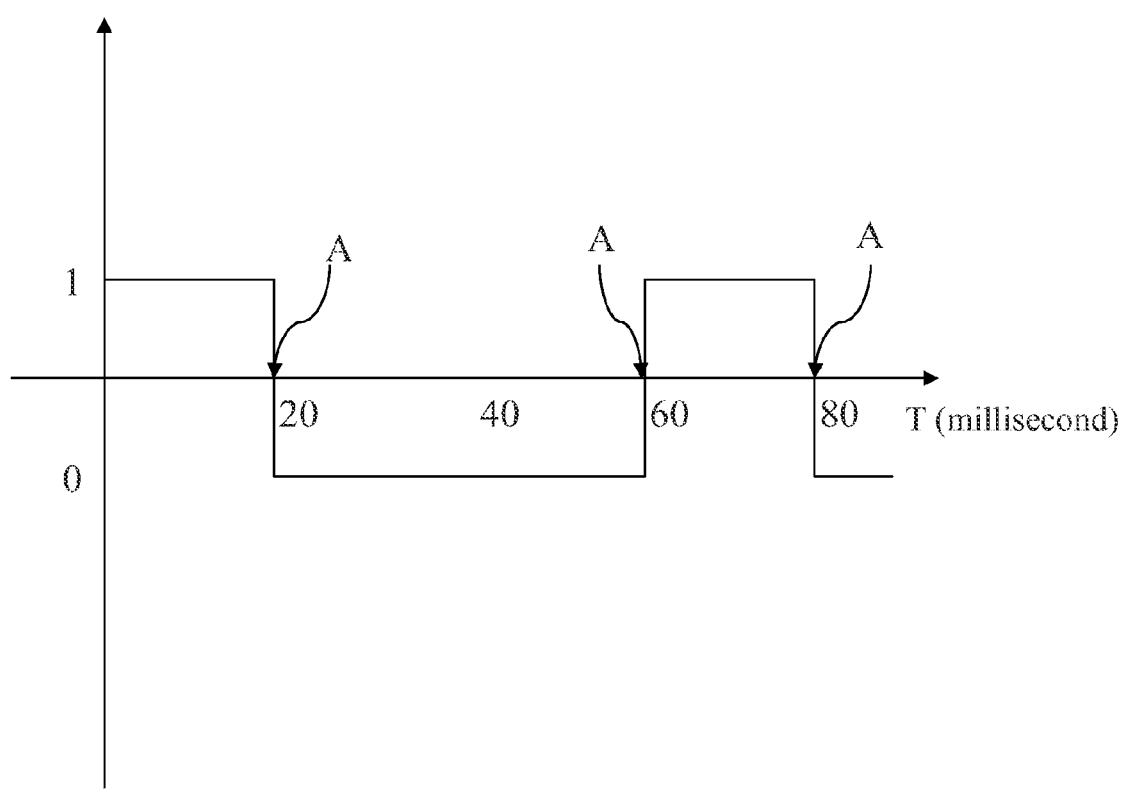
FIG. 3 is a schematic view of a satellite signal having a plurality of correct phase inversion points according to the present invention.

After it is determined that each time difference between the each two adjacent phase inversion points among the plurality of phase inversion points is an integral multiple of 20 milliseconds, i.e., the satellite signal that is taken has correct phase inversion points (as shown in FIG. 3, the time differences between each two phase inversion points A are all integral multiples of 20 milliseconds), the fifth step is performed, so as to retrieve a navigation data from the satellite signal.

In the sixth step (step 26), the data from the satellite signal every 20 milliseconds is retrieved by using the first phase inversion point A in the plurality of phase inversion points A as the starting point. As shown in FIG. 3, when each time difference between adjacent phase inversion points A is an integral multiple of 20 milliseconds, a correct navigation data 10010 . . . in the satellite signal may be retrieved.

As such, the method for obtaining correct phase inversion points in the Signal of GPS may be applied in a device having a GPS, for example, portable electronic devices such as a cell phone and a notebook computer. The electronic device having a GPS may have an antenna and a processor. The antenna is used for receiving satellite signals from one of the plurality of satellites. The processor is used for interpreting a plurality of phase inversion points and calculating the time difference between each two adjacent phase inversion points after the satellite signal is received.

The method for obtaining correct phase inversion points in the Signal of GPS according to the present invention is applied in a GPS. First, the satellite signal is continuously received to obtain a plurality of phase inversion points. Then, it is calculated to see whether each time difference between each two adjacent phase inversion points among the plurality of phase inversion points is an integral multiple of 20 milliseconds or not. When each time difference between each two adjacent phase inversion points is an integral multiple of 20 milliseconds, the correct phase inversion points in the Signal of GPS may then be obtained. Subsequently, the correct navigation data in the satellite signal is obtained by taking a data from the satellite signal every 20 milliseconds by using the first phase inversion point as the starting point. The method for obtaining correct phase inversion points in the Signal of GPS according to the present invention may still be used to obtain the correct phase inversion points in the satellite signal with the influences of the weak satellite signal or intense noises, which thus increases a positioning speed, and reduces the positioning time required.

What is claimed is:

1. A method for obtaining correct phase inversion points in a signal of global positioning system (GPS), comprising:
   receiving a satellite signal from one of a plurality of satellites continuously;
   interpreting a plurality of phase inversion points in the received satellite signal;
   calculating each time difference between each two adjacent phase inversion points among the plurality of phase inversion points;
   determining whether each of the time differences is an integral multiple of 20 milliseconds or not; and
   retrieving a data every 20 milliseconds from the satellite signal by using a first phase inversion point in the plurality of phase inversion points as a starting point, if each of the time differences is an integral multiple of 20 milliseconds.

2. The method for obtaining correct phase inversion points in a signal of global positioning system according to claim 1, wherein each of the phase inversion points is logical 0 to logical 1 or logical 1 to logical 0.

3. The method for obtaining correct phase inversion points in a signal of global positioning system according to claim 1, wherein when the time differences are not all the integral multiple of 20 milliseconds, the satellite signal from another one of the plurality of satellites is received continuously.

4. The method for obtaining correct phase inversion points in a signal of global positioning system according to claim 1, wherein the step of interpreting the plurality of phase inversion points in the received satellite signal is interpreting the received satellite signal to obtain a plurality of phase inversion points within a time range.

5. The method for obtaining correct phase inversion points in a signal of global positioning system according to claim 4, wherein the time range is 1 second.

* * * * *